US00RE50298E

(19) United States
(12) Reissued Patent
Edsall et al.

(10) Patent Number: US RE50,298 E
(45) Date of Reissued Patent: Feb. 11, 2025

(54) EXPORTING REAL TIME NETWORK TRAFFIC LATENCY AND BUFFER OCCUPANCY

(71) Applicant: Cisco Technology, Inc., San Jose, CA (US)

(72) Inventors: Thomas J. Edsall, Los Gatos, CA (US); Yue J. Yang, San Jose, CA (US); Wei-Jen Huang, Burlingame, CA (US); Chih-Tsung Huang, Burlingame, CA (US)

(73) Assignee: CISCO TECHNOLOGY, INC., San Jose, CA (US)

(21) Appl. No.: 17/329,520

(22) Filed: May 25, 2021

Related U.S. Patent Documents

Reissue of:
(64) Patent No.: 9,641,407
Issued: May 2, 2017
Appl. No.: 15/285,603
Filed: Oct. 5, 2016

U.S. Applications:
(60) Division of application No. 16/400,122, filed on May 1, 2019, now Pat. No. Re. 48,645, which is an
(Continued)

(51) Int. Cl.
*H04L 12/26* (2006.01)
*H04L 43/045* (2022.01)
(Continued)

(52) U.S. Cl.
CPC ..... *H04L 43/045* (2013.01); *H04L 43/08* (2013.01); *H04L 43/0882* (2013.01);
(Continued)

(58) Field of Classification Search
CPC ... H04L 43/08; H04L 43/045; H04L 43/0882; H04L 43/10; H04L 47/24; H04L 47/30
See application file for complete search history.

(56) References Cited

U.S. PATENT DOCUMENTS 5,546,389 A * 8/1996 Wippenbeck ..... G06F 13/18 370/412
6,170,022 B1 * 1/2001 Linville ..... H04L 47/30 710/36
(Continued)

FOREIGN PATENT DOCUMENTS

GB 2477640 A 8/2011
WO 2008/097001 A1 8/2008

OTHER PUBLICATIONS

Office Action in counterpart Indian Application No. 201928047007, mailed Dec. 24, 2021, 6 pages.
(Continued)

*Primary Examiner* — John M Hotaling, II
(74) *Attorney, Agent, or Firm* — Edell, Shapiro & Finnan, LLC

(57) ABSTRACT

Techniques are presented herein to facilitate the monitoring of occupancy of a buffer in a network device. Packets are received at a network device. Information is captured describing occupancy of the buffer caused by packet flow through the buffer in the network device. Analytics packets are generated containing the information. The analytics packets from the network device for retrieval of the information contained therein for analysis, replay of buffer occupancy, etc.

23 Claims, 6 Drawing Sheets

Related U.S. Application Data application for the reissue of Pat. No. 9,641,407, which is a continuation of application No. 14/707,139, filed on May 8, 2015, now Pat. No. 9,509,622, which is a continuation of application No. 13/708,265, filed on Dec. 7, 2012, now Pat. No. 9,077,619.

(60) Provisional application No. 61/702,320, filed on Sep. 18, 2012.

(51) Int. Cl.

| | |
|---|---|
| ***H04L 43/08*** | (2022.01) |
| ***H04L 43/0882*** | (2022.01) |
| ***H04L 43/10*** | (2022.01) |
| ***H04L 47/24*** | (2022.01) |
| ***H04L 47/30*** | (2022.01) |

(52) U.S. Cl.

CPC ..... *H04L 43/10* (2013.01); *H04L 47/24* (2013.01); *H04L 47/30* (2013.01)

(56) References Cited

U.S. PATENT DOCUMENTS 6,192,406 B1* 2/2001 Ma ..... H04L 47/10 709/224
6,246,684 B1 6/2001 Chapman et al.
6,333,917 B1* 12/2001 Lyon ..... H04L 43/10 370/252
6,690,646 B1 2/2004 Fichou et al.
6,788,697 B1* 9/2004 Aweya ..... H04L 49/9036 370/252
6,853,623 B2 2/2005 Nederveen et al.
6,892,237 B1 5/2005 Gai et al.
6,990,202 B2 1/2006 Wee et al.
7,106,731 B1 9/2006 Lin et al.
7,395,332 B2 7/2008 Gai et al.
7,466,703 B1* 12/2008 Arunachalam ..... H04L 45/60 370/392
7,474,666 B2 1/2009 Kloth et al.
7,656,818 B1 2/2010 Baroudi et al.
7,792,130 B2 9/2010 Fischer
7,830,793 B2 11/2010 Gai et al.
7,899,048 B1 3/2011 Walker et al.
7,961,621 B2 6/2011 Bergamasco et al.
7,969,971 B2 6/2011 Gai et al.
8,116,307 B1 2/2012 Thesayi et al.
8,170,025 B2* 5/2012 Kloth ..... H04L 49/555 709/236
8,208,389 B2 6/2012 Alaria et al.
8,238,287 B1* 8/2012 Gopi ..... H04L 43/16 370/401
8,274,905 B2 9/2012 Edwards et al.
8,520,522 B1* 8/2013 Goldman ..... H04L 47/26 370/235
8,601,297 B1* 12/2013 Abts ..... G06F 1/3253 713/320
8,605,588 B2 12/2013 Sankaran et al.
8,640,036 B2 1/2014 Pignataro et al.
8,681,806 B2 3/2014 Bucknell et al.
8,767,551 B2 7/2014 Goldfarb et al.
8,817,615 B2* 8/2014 Kutscher ..... H04W 28/0284 370/204
8,964,547 B1* 2/2015 Rygh ..... H04L 47/28 370/235
9,154,452 B2* 10/2015 Thottan ..... H04L 49/9005
9,917,874 B2* 3/2018 Luby ..... H04L 65/756
2003/0007456 A1* 1/2003 Gupta ..... H04L 1/0002 370/232
2003/0081546 A1* 5/2003 Agrawal ..... H04L 47/50 370/412
2003/0231596 A1 12/2003 Hong
2004/0128343 A1* 7/2004 Mayer ..... H04N 21/2668 348/E7.072
2005/0180250 A1* 8/2005 Suzzoni ..... G06F 5/06 365/230.05
2005/0182850 A1 8/2005 Kohno
2005/0240745 A1 10/2005 Iyer et al.
2006/0062209 A1 3/2006 Riley
2006/0253900 A1 11/2006 Paddon et al.
2006/0268847 A1 11/2006 Halbraich et al.
2007/0201870 A1* 8/2007 Cohen ..... H04Q 11/0005 398/51
2008/0049787 A1* 2/2008 McNaughton ..... H04L 12/66 370/468
2008/0279207 A1* 11/2008 Jones ..... H04L 47/6235 370/412
2008/0285463 A1 11/2008 Oran
2009/0034416 A1 2/2009 Baron et al.
2009/0041011 A1 2/2009 Sheppard
2009/0100040 A1 4/2009 Sheppard et al.
2009/0171474 A1 7/2009 Birze et al.
2009/0252040 A1* 10/2009 Kocaturk ..... H04W 28/06 370/310
2010/0023635 A1* 1/2010 Labonte ..... H04L 47/29 709/231
2010/0054152 A1 3/2010 Foschiano et al.
2010/0154033 A1 6/2010 Oulai
2010/0162399 A1* 6/2010 Sheleheda ..... H04L 63/1416 726/24
2010/0287297 A1 11/2010 Lefebvre
2012/0093505 A1 4/2012 Yeap et al.
2012/0120254 A1* 5/2012 Tan ..... H04L 65/65 348/184
2012/0215909 A1 8/2012 Goldfarb et al.
2012/0317276 A1* 12/2012 Muniraju ..... H04L 41/14 709/224
2012/0327779 A1* 12/2012 Gell ..... H04L 47/6275 370/235
2012/0330804 A1* 12/2012 Morrill ..... H04M 15/854 705/34
2013/0007223 A1* 1/2013 Luby ..... H04N 21/234327 709/219
2013/0028088 A1* 1/2013 Do ..... H04L 1/1887 370/235
2013/0067034 A1* 3/2013 Degioanni ..... H04L 43/04 709/218
2013/0155858 A1 6/2013 Chen et al.
2013/0188482 A1* 7/2013 Lee ..... H04L 47/25 370/235
2013/0194923 A1 8/2013 Basso et al.
2015/0244637 A1 8/2015 Edsall et al.

OTHER PUBLICATIONS

English translation of First Office Action and Search Report in counterpart Chinese Application No. 201380048250.6, mailed Nov. 21, 2016, 10 pages.
English translation of Second Office Action in counterpart Chinese Application No. 201380048250.6, mailed May 2, 2017, 3 pages.
First Examination Report in counterpart Indian Application No. 444/MUMNP/2015, mailed May 24, 2019, 6 pages.
Williams, Randy, Arista Networks Inc., "LANZ Streaming Client Configuration", Dec. 2, 2011, 2 pages.
Donahue, Gary A., "Arista Warrior", Chapter 20, ISBN: 978-1-449-31453-8, O'Reilly Media Inc., Oct. 3, 2012, 15 pages.
Arista Networks Inc., "LANZ—A New Dimension in Network Visibility", Latency Analyzer (LANZ) Technical Bulletin, Mar. 15, 2011, 5 pages.
International Search Report and Written Opinion in counterpart International Application No. PCT/US2013/059180, mailed Nov. 28, 2013, 10 pages.
Cisco Systems, Inc., "Cisco Nexus 3000 Series NX-OS Release Notes, Release 5.0(3)U2(1)," pp. 1-12, Aug. 31, 2011.

* cited by examiner

EXPORTING REAL TIME NETWORK TRAFFIC LATENCY AND BUFFER OCCUPANCY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[RELATED APPLICATIONS] *CROSS REFERENCE TO RELATED APPLICATION*

[This application is a continuation of U.S. application Ser. No. 14/707,139, filed May 8, 2015, which in turn is turn is a continuation of U.S. application Ser. No. 13/708,265, filed Dec. 7, 2012, now U.S. Pat. No. 9,077,619, which in turn claims priority to U.S. Provisional Application No. 61/702,320, filed Sep. 18, 2012, entitled "Exporting Real Time Network Traffic Latency and Buffer Occupancy." The entirety of these applications is incorporated herein by reference.] *This is an application for reissue of U.S. Pat. No. 9,641,407, and is a divisional of U.S. application Ser. No. 16/400,122, filed May 1, 2019, which is also an application for reissue of U.S. Pat. No. 9,641,407, which is a continuation of U.S. application Ser. No. 14/707,139, filed May 8, 2015, now U.S. Pat. No. 9,509,622, which is a continuation of U.S. application Ser. No. 13/708,265, filed Dec. 7, 2012, now U.S. Pat. No. 9,077,619, which claims the benefit of U.S. Provisional Application No. 61/702,320, filed Sep. 18, 2012.*

TECHNICAL FIELD

The present disclosure relates generally to analysis of occupancy of a buffer in a network device.

BACKGROUND

In a computer network, data is transmitted from a source to a destination in the form of packets that generally pass through one or more network devices (e.g., switches, routers, firewalls, etc.). During the transmission, certain errors may arise that result in, for example, redundant data being added to the original data, dropped packets, etc. Massively Scalable Data Center and Cloud Computing systems are putting more traffic load on network equipment such that over-provisioned networks are no longer possible. Monitoring of a buffer in a network device is useful to gain knowledge for network administration, analysis, and performance.

DESCRIPTION OF EXAMPLE EMBODIMENTS

Overview

Techniques are presented herein to facilitate the monitoring of occupancy of a buffer in a network device. Packets are received at a network device. Information is captured describing occupancy of the buffer caused by packet flow through the buffer in the network device. Analytics packets are generated containing the information. The analytics packets from the network device for retrieval of the information contained therein for analysis, replay of buffer occupancy, etc.

Example Embodiments

Complete network visibility into buffer occupancy and the ability to replay occupancy via export and post processing is important since network disruptions (e.g., microbursts) can occur at any time. Furthermore, the ability to replay buffer occupancy allows for effective diagnosis of network issues to provide corrective actions. Existing solutions such as port mirroring (i.e., Switched Port Analyzer (SPAN)) do not provide visibility of buffer occupancy. As such, presented herein are techniques for monitoring and replaying buffer occupancy.

Figure 1:
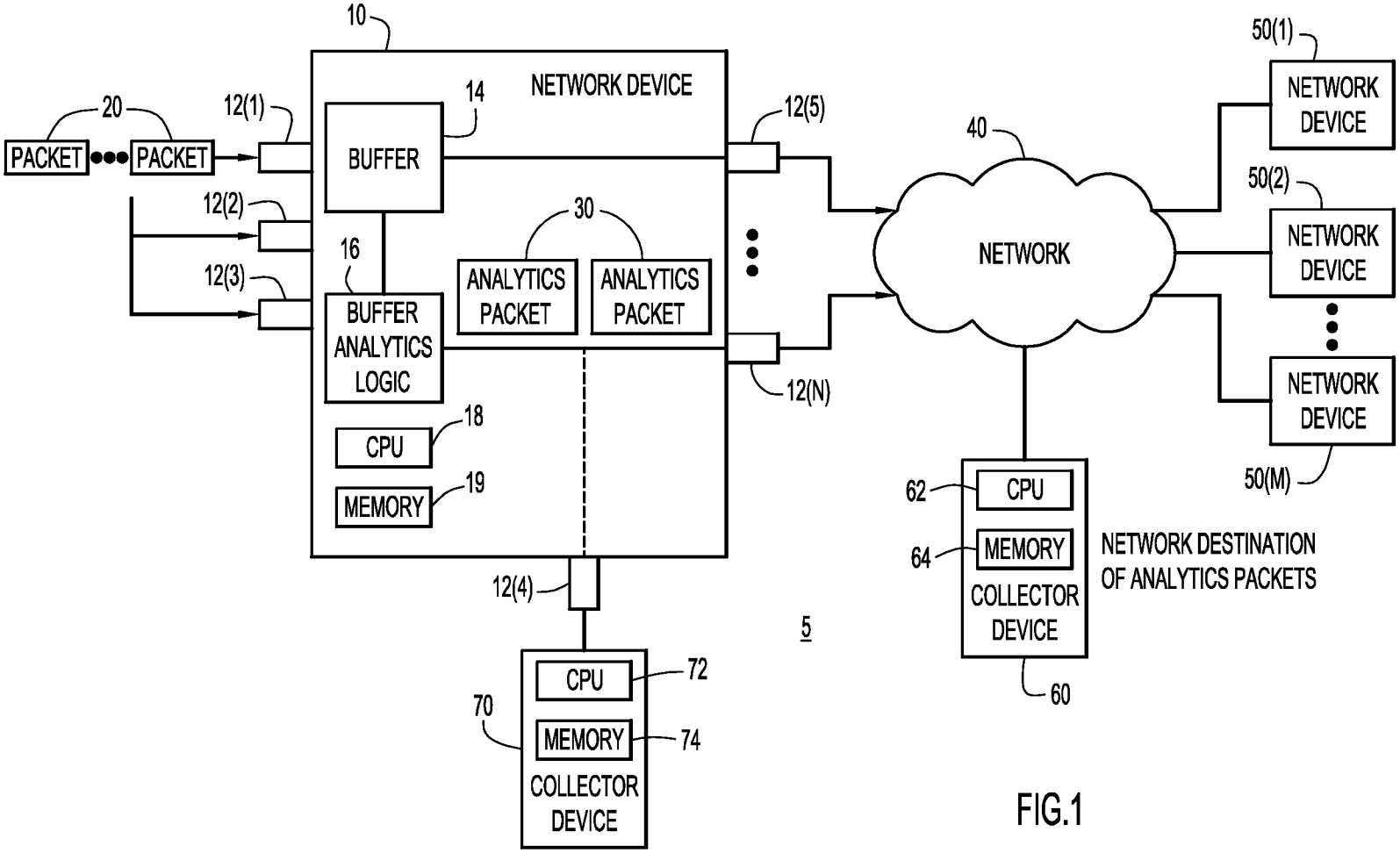
FIG. 1 is a diagram illustrating a network device configured to generate buffer analytics packets based on occupancy of a buffer in the network device.

Referring now to FIG. 1, a diagram is shown of a network environment 5 in which a network device 10 is provided that is configured to generate buffer analytics packets based on occupancy of a buffer the network device 10. The network device 10 comprises a plurality of ports 12(1)-12(N), any of which can serve as an ingress port or egress port at any time. The network device includes a buffer 14, buffer analytics logic 16, a central processing unit (CPU) 18 and memory 19. It should be understood that there are other components of the network device 10, such as a switch fabric or application specific integrated circuit (ASIC), and the buffer 14 may reside the switch fabric. There are typically numerous buffers in the network device 10, but for simplicity only one is shown in FIG. 1. It should be understood that the techniques presented herein are useful for each of a plurality of buffers in a network device. The buffer analytics logic 14 may be implemented in hardware by digital logic gates (and embedded in the switch fabric) or by software stored in memory 19 and executed by CPU 18.

Packets 20 arrive at the network device 10 via any of the ports 12(1)-12(N). FIG. 1 shows an example where packets are arriving at ports 12(1), 12(2) and 12(3). The network device 10 is coupled to a network 40, e.g., a local area network or wide area network (the Internet), via ports 12(5)-12(N) to ultimately communicate with any one or more of the network devices 50(1)-50(M).

Generally, the buffer analytics logic 16 captures information describing occupancy of the buffer 14 caused by packet flow through the buffer in the network device 10, and generates buffer analytics packets 30 containing the information. As will become apparent from the description below in connection with FIG. 2, there are two types of buffer analytics packets: enqueue buffer analytics packets and dequeue buffer analytics packets. The buffer analytics packets 30 are then output from the network device 10 at a programmable time schedule (or based of packet size) in any one of several ways to allow for replay of the occupancy of the buffer.

First, the network device 10 may insert into buffer analytics packets 30 an address for a destination of the buffer analytics packet, e.g., address for any device connected to the network 40, such as collector device 60 having a CPU 62 and memory 64. The network device 10 sends the analytics packet 30 via network 40 to the destination collector device 60, which may be at any location, local or remote from network device 10.

Second, the network device 10 may output the analytics packet 30 to a dedicated port, e.g., port 12(4) of the network device 10 to which a collector device 70 is connected. The dedicated analytics port 12(4) can participate in port channel or fixed port distribution to expand bandwidth to a single or multiple monitor ports. The collector device 70, since it is connected directly to port 12(4), is usually local to the network device 10. The collector device 70 includes a CPU 72 and memory 74.

Third, the analytics packets 30 may be output to the onboard CPU 18 and memory 19 in the network device 10, such that CPU 18 and memory 19 also serve as a collector device. In any of these scenarios, the CPUs 18, 62 and 72 may replay and analyze the occupancy of the buffer 14 based on software instructions stored in its associated memory 19, 64 and 74, respectively. Moreover, the analytics packets are stored in the memory 19, 64 and 74 for the associated CPU 18, 62 and 72, respectively.

The network device 10 can be any network device now known or hereinafter developed, including a switch, router, gateway, a software stack on a host device, virtual network interface cards (VNICs) virtual switches, physical network interface cards (including those that support virtualization).

Memory 19, 64 and 74 may comprise read only memory (ROM), random access memory (RAM), magnetic disk storage media devices, optical storage media devices, flash memory devices, electrical, optical, or other physical/tangible memory storage devices. Thus, in general, the memory 19, 64 and 74 may comprise one or more tangible (non-transitory) computer readable storage media (e.g., a memory device) encoded with software comprising computer executable instructions and when the software is executed (by the associated CPU) it is operable to perform the operations described herein.

Figure 2:
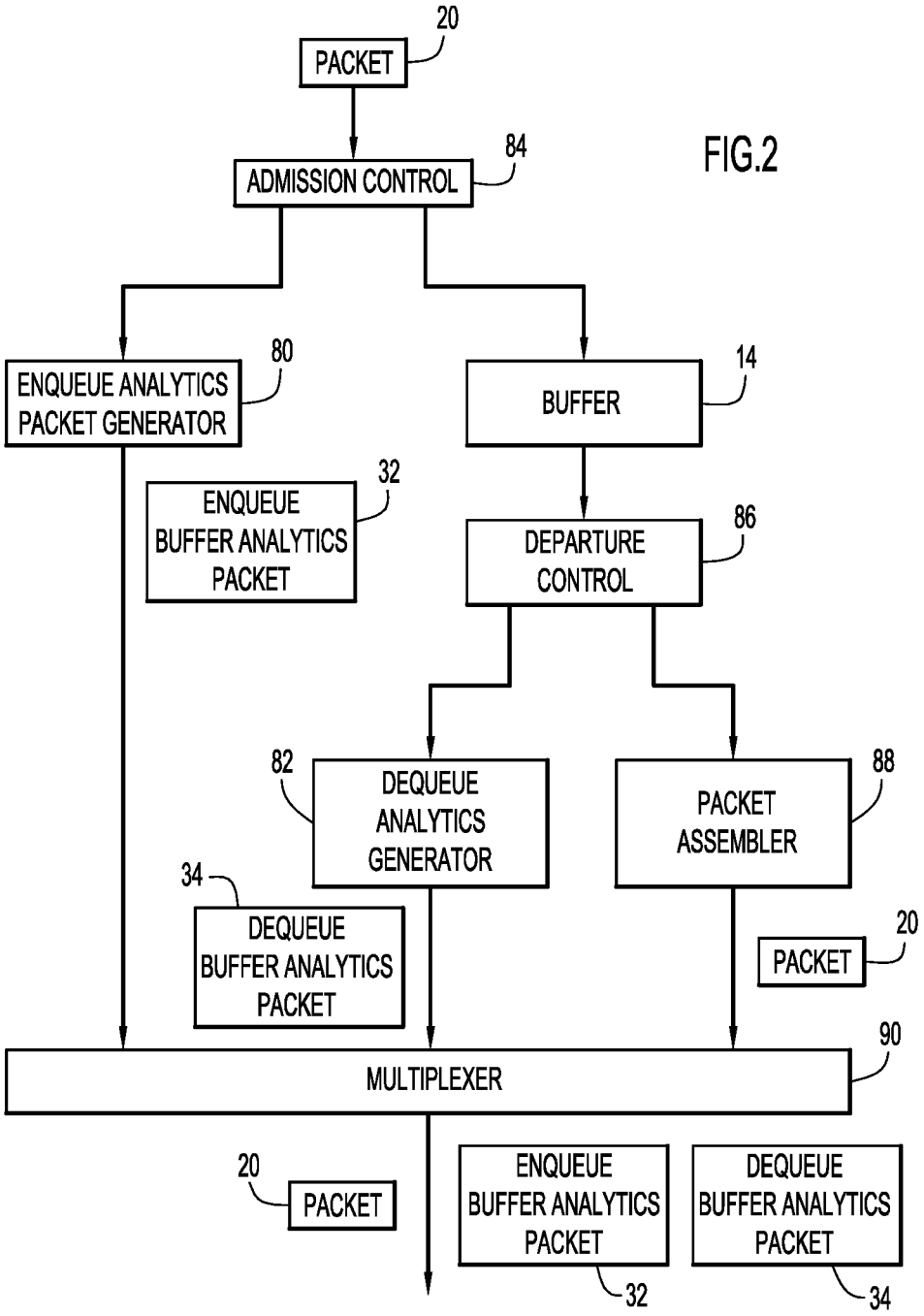
FIG. 2 is a block diagram illustrating one example implementation of the buffer analytics logic.

Reference is now made to FIG. 2 for a more detailed description of the buffer analytics logic 16. FIG. 2 shows that the buffer analytics logic 16 comprises an enqueue analytics packet generator 80 and a dequeue analytics packet generator 82. In addition, there are an admission control block 84, a departure control block 86, a packet assembler 88 and a multiplexer 90. The admission control block 84 and departure control block 86 are commonly found in a network device and are hardware (or software) blocks used to make processing decisions, such as a drop, scheduling, rate limiting, policing, shaping, etc.

The enqueue analytics packet generator 80 is configured to generate an analytics packet, called an enqueue buffer analytics packet shown at reference numeral 32, that describes/summarizes a packet being enqueued into buffer 14. Similarly, the dequeue analytics packet generator 82 is configured to generate an analytics packet, called a dequeue buffer analytics packet shown at reference numeral 34, that describes/summarizes a packet being dequeued from buffer 14. The packet assembler 88 assembles a packet 20 ready out from the buffer 14 for output from the network device.

The enqueue analytics packet generator 80 captures, for a packet enqueued to buffer 14, information describing one or more of identification of ingress port of arrival of the packet at the network device, Layer 2 source address and destination address, Layer 3 source address and destination address, Layer 4 source address and destination address, class of service, and timestamp of arrival at the ingress port. Similarly, the dequeue analytics packet generator 82 captures, for a packet dequeued from the buffer 14, information describing one or more of identification of egress port for departure of the packet from the network device, Layer 2 source address and destination address, Layer 3 source address and destination address, and timestamp of departure from the egress port.

The enqueue buffer analytics packet 32 generated by the enqueue analytics packet generator 80, dequeue buffer analytics packet 34 generated by the dequeue analytics packet generator 82, and packet 20 output by the packet assembler 88, are all supplied to a corresponding input of the multiplexer 90. The multiplexer 90 selectively outputs, at any given time, either a packet 20, an enqueue buffer analytics packet 32 or a dequeue buffer analytics packet 34. Priority is given to output of a packet 20 in order to maintain proper flow of network traffic through the network device 10. Trigger for output of an analytics packet may be based on time (according to a schedule) or size of a packet enqueued to the buffer or dequeued from the buffer.

*Replay of buffer occupancy has several categories, namely the buffer enqueue, buffer dequeue, buffer enqueue drop, and buffer dequeue drop, each having properties to facilitate buffer visibility. The buffer enqueue is defined as any packet that is admitted to the buffer, while buffer dequeue is defined as any packet that is removed from the buffer. Buffer enqueue drop is defined as any packet that is not admitted to the buffer, while buffer dequeue drop is defined as any packet that is admitted to the buffer, but that will be dropped. Recording each of these categories would require enormous bandwidth if a complete packet is captured. However, the entire packet is not necessary for analysis and a replay of the buffer may use specific pieces of information that is of interest to network administrators and application developers.*

*Therefore, in accordance with examples presented herein, a networking device is configured to filter packets in a network buffer and to generate a "record" for selected packets. Each captured record corresponds to a single buffered packet and is, in essence, a truncation of the packet. The record includes only certain desired information about the packet (i.e. selected information desired by a network administrator).*

*Examples of record fields can include, but are not limited to: (1) Ethernet packet header information such as media access control (MAC) destination address/source address (DA/SA), Internet Protocol (IP) DA/SA, class of service (CoS), or type of service (TOS); (2) a timestamp of the packet arrival and/or departure to/from the buffer to create replay; (3) a timestamp based on a local or global clock derived from protocols such as Precision Time Protocol (PTP) or Network Time Protocol (NTP); (4) buffer occupancy characteristics such as overall, priority, unicast or multicast queue length; (5) packet properties such as drop, port mirrored, load balanced, bridged or routed, and packet length; or (6) packet error properties such as Cyclic Redundancy Check (CRC), Runt, Giant, and Jabber.*

Figure 3:
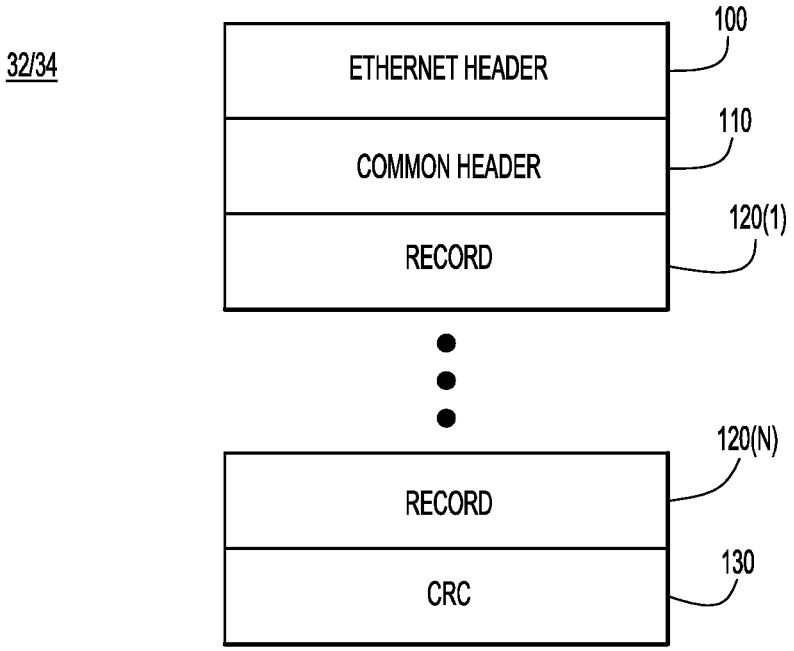
FIG. 3 is a diagram that generally illustrates a format of a buffer analytics packet.

Reference is now made to FIG. 3. FIG. 3 shows an example format of an enqueue buffer analytics packet 32 or dequeue buffer analytics packet 34. As explained above, an enqueue buffer analytics packet 32 summarizes a packet that is being enqueued to a buffer and a dequeue buffer analytics packet 34 summarizes a packet that is being dequeued from the buffer. These analytics packets, when accumulated over time for packets that pass through the buffer, allow for playback of occupancy characteristics of the buffer and traffic flow of packets through the buffer. As shown in FIG. 3, an enqueue buffer analytics packet 32 and a dequeue buffer analytics packet 34 includes an Ethernet Header field 100, a Common Header field 110, one or more Records fields 120(1)-120(N) and a cyclic redundancy check (CRC) field 130.

The Ethernet header field 110 is field that is used to encapsulate the destination address of the analytics packet, e.g., to direct the analytics packet to a destination, i.e., a local or remote collector device (as indicated in FIG. 1), including to the CPU of the network device itself. To this end, the Ethernet header field 110 includes information, such as media access control (MAC) destination address/source address (DA/SA), optional IEEE 802.1q virtual local area network (VLAN) routing information, an optional Internet Protocol (IP) header including an IP SA and IP DA. Again, the Ethernet header field 110 contains information used to route the buffer analytics packet to its desired destination.

The common header field 110 contains information captured from the header of a packet that has been enqueued to or dequeued (as the case may be) from the buffer. Thus, the common header field summarizes the header of a packet that is enqueued to and dequeued from the buffer in the network device. For example, the common header field includes information for a common header version (to allow for backward/future compatibility), timescale information representing the timescale of the enqueued or dequeued packet, a timestamp of the packet arrival and/or departure to/from the buffer to allow for replay, a record number to allow a collector to determine how many, if any records, have been lost in between the current analytics packet and the last received analytics packet, and one or more user defined fields such as class of service, type of service, etc.

The record field 120 contains data for an enqueued or dequeued packet that a user configures the buffer analytics logic to capture. Examples of data that may be include in a record field includes:

Format version to indicate a format version of the record field for backward/future compatibility.

L2 Header Fields (MAC SA/DA) or compressed versions (i.e. last 24 bits) and priority L3 Header (IP SA/DA) or compressed versions (i.e. last 16 bits) and priority and protocol type L4 Header (TCP/UDP SA/DA)

User defined fields, including one or more of:

Input/output port

Drop—an indication of whether the packet was dropped.

Queue id—identifier of the queue (unicast or multicast) to which the packet is associated.

Queue length—length of the queue to which the packet is associated.

Packet length—overall length of size of the packet.

Timestamp (absolute or relative to common header from protocols such as Precision Time Protocol (PTP) or Network Time Protocol (NTP))

Programmable bytes—any user configurable one or more bytes of the payload of a packet Internally specific fields such as logical interface mapped from table with keys such as {ingress/egress port, vlan}

Last record—to indicate that this is last record field in the analytics packet.

Thus, to summarize, the record field 120 for an analytics packet contains information about an enqueued packet or dequeued packet to describe buffer occupancy characteristics such as overall buffer occupancy, buffer occupancy based on packet priority, unicast queue length, multicast queue length; packet properties such as drop, port mirrored, load balanced, bridged or routed, and packet length; and packet error properties such as Cyclic Redundancy Check (CRC), and various error protocols such as Runt, Giant, and Jabber. More specifically, for a packet enqueued to the buffer, information is included in the record field describing one or more of identification of ingress port of arrival of the packet at the network device, Layer 2 source address and destination address, Layer 3 source address and destination address, Layer 4 source address and destination address, class of service, and timestamp of arrival at the ingress port. Similarly, for a packet dequeued from the buffer, information is included in the record field describing one or more of identification of egress port for departure of the packet from the network device, Layer 2 source address and destination address, Layer 3 source address and destination address, and timestamp of departure from the egress port. Other examples of data captured into user defined fields include an indication of a packet being rate limited, shaped, policed as well as any programmable bytes of the packet including payload.

The size of the analytics packet (Ethernet header field, common header field and records) may be the Maximum Transmit Unit (MTU), a switch specific analytics MTU, determined using a time-based method (e.g., analytics packet generated and transmitted at predetermined times), determined based on a selected number of packets, or by other techniques.

Figure 4:
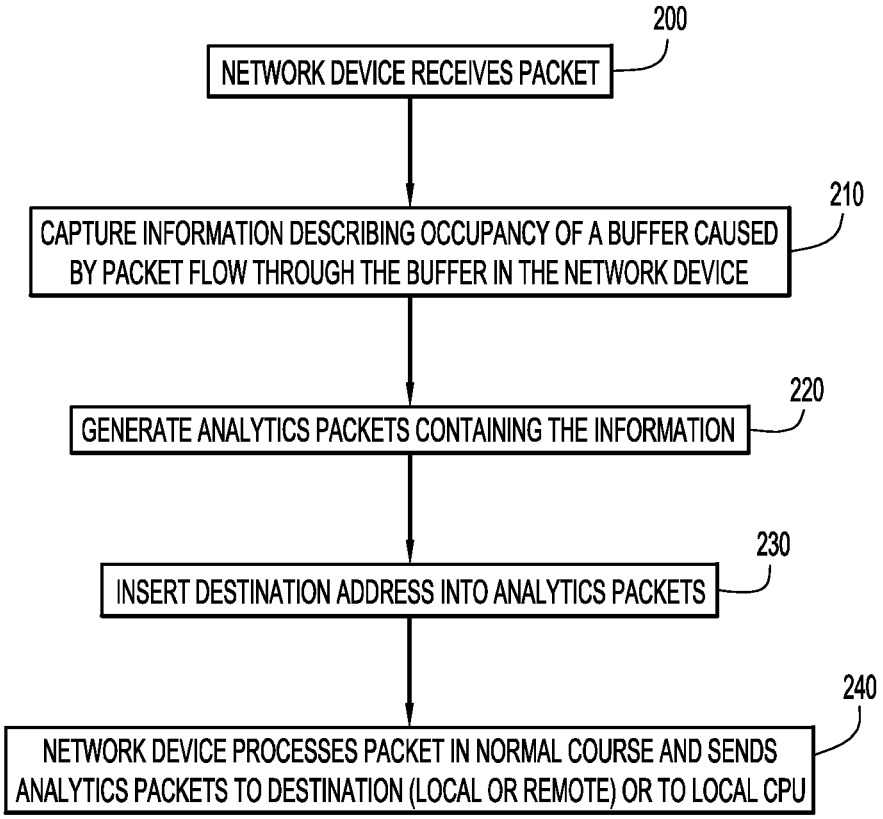
FIG. 4 is a flow chart depicting operations in a network device to generate and output buffer analytics packets.

Reference is now made to FIG. 4. FIG. 4 provides a flow chart that depicts the high level operations performed in a network device in generating and outputting analytics packets. At 200, a network device receives a packet. At 210, the network device captures information describing occupancy of a buffer caused by packet flow through the buffer in the network device. At 220, an analytics packet is generated for each packet that is enqueued to and/or dequeued from the buffer. At 230, a destination address is inserted into the analytics packet. At 240, the network device processes the packet in the normal course, and outputs an analytics packet to its destination (local or remote network destination) or to a local CPU of the network device. The capturing, generating, and outputting operations are triggered to be performed based on at least one of time and size of enqueued packet or dequeued packet.

Figure 5:
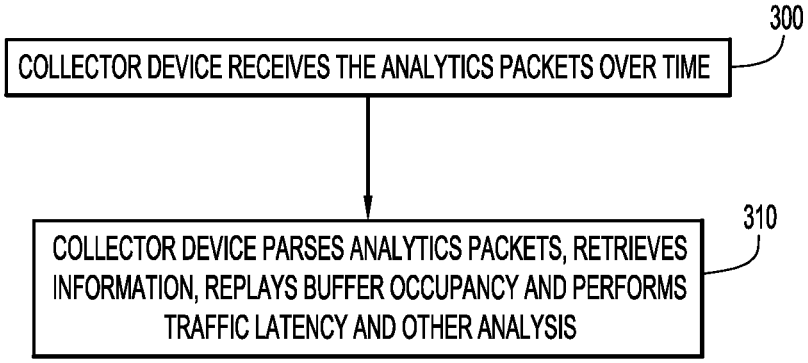
FIG. 5 is a flow chart depicting operations in a device that receives and retrieves information from the buffer analytics packets.

FIG. 5 illustrates a high level flow chart depicting the operations performed at a destination of the analytics packets. At 300, a collector device receives the analytics packets over time. At 310, the collector device parses the analytics packets to retrieve information in the individual records as well as the common header, and uses this information to replay buffer occupancy, perform traffic latency and perform other analysis.

Figure 6:
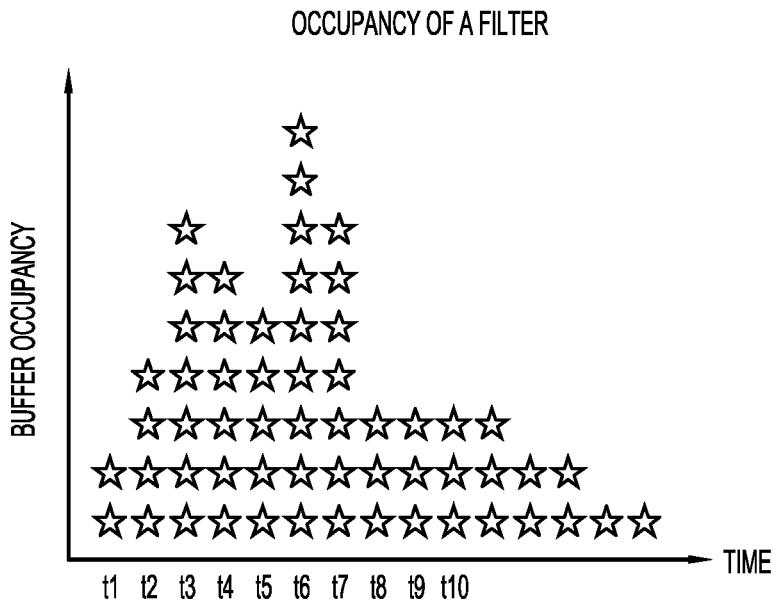
FIG. 6 is a diagram illustrating an example of playback of buffer occupancy from buffer analytics packets.

FIG. 6 shows an example of how a replay of buffer occupancy, subject to certain filtering criteria, may be made. In FIG. 6, a "*" represents data that has been stored into buffer and lack of "*" represents absence or removal of data from the buffer.

By generating and exporting analytics packets that summarize properties of packets enqueued to and dequeued from a buffer in a network device, a replay of the buffer may be achieved using specific pieces of information that are of interest to network administrators and application developers. Recording each of these categories would require enormous bandwidth if a complete enqueued or dequeued packet is captured.

In summary, presented herein are techniques that enable a time-based complete replay of the buffer occupancy with resolution determined by a sampling period. These techniques provide visibility of traffic flows received by network devices. The information provided can be used by network administrators to gain insight into their specific network traffic, such as per-packet latency, buffer occupancy, and possible congestion sources. This information can lead to better allocation and provisioning of network resources, reduced congestion, and higher overall throughput. By parsing and aggregating relevant characteristics from each packet according to the techniques presented herein, bandwidth requirements associated with network monitoring are greatly reduced. As such, these techniques assist in reducing the amount of data exported for analysis.

The above description is intended by way of example only.

What is claimed is:

[1. A method comprising:

at a collector device configured to be in communication with a network device operating in a network:

receiving analytics packets containing information describing occupancy of a buffer of the network device caused by packet flow through the buffer in the network device, each analytics packet including a record summarizing characteristics of a packet enqueued in the buffer or of a packet dequeued from the buffer; and replaying the information pertaining to the occupancy of the buffer over time based on the analytics packets, by generating data for visually presenting to a user the information pertaining to the occupancy of the buffer over time.]

[2. The method of claim 1, wherein replaying is based on one or more filtering criteria.]

[3. The method of claim 1, wherein the information describes at least one of: identification of ingress port of arrival of a packet at the network device, Layer 2 source address and destination address, Layer 3 source address and destination address, Layer 4 source address and destination address, class of service, or timestamp of arrival of a packet at the ingress port.]

[4. The method of claim 1, wherein the information describes at least one of: identification of egress port for departure of a packet from the network device, Layer 2 source address and destination address, Layer 3 source address and destination address, or timestamp of departure of a packet from the egress port.]

[5. The method of claim 1, wherein the analytics packets include enqueue analytics packets and dequeue analytics packets, the enqueue analytics packets including information describing properties associated with a packet being enqueued to the buffer in the network device and the dequeue analytics packets including information describing properties associated with a packet being dequeued from the buffer in the network device.]

[6. The method of claim 1, wherein the information describes buffer occupancy characteristics of the buffer including at least one of: overall buffer occupancy, buffer occupancy based on packet priority, unicast queue length or multicast queue length.]

[7. The method of claim 1, wherein the information describes packet processing properties for packets processed by the network device including at least one of: drop, port mirrored, load balanced, bridged or routed, or packet length.]

[8. The method of claim 1, wherein the information describes packet processing properties for packets corresponding to user defined parameters for one or more of: rate limited, shaped, policed or any programmable bytes of the packet including payload.]

[9. An apparatus comprising:

a memory;

a processor coupled to the memory and configured to be in communication with a network device operating in a network, and configured to:

receive analytics packets containing information describing occupancy of a buffer of the network device caused by packet flow through the buffer in the network device, each analytics packet including a record summarizing characteristics of a packet enqueued in the buffer or of a packet dequeued from the buffer; and replay the information pertaining to the occupancy of the buffer over time based on the analytics packets, by generating data for visually presenting to a user the information pertaining to the occupancy of the buffer over time.]

[10. The apparatus of claim 9, wherein the processor is configured to generate data to replay the information based on one or more filtering criteria.]

[11. The apparatus of claim 9, wherein the information describes at least one of: identification of ingress port of arrival of a packet at the network device, Layer 2 source address and destination address, Layer 3 source address and destination address, Layer 4 source address and destination address, class of service, or timestamp of arrival of a packet at the ingress port.]

[12. The apparatus of claim 9, wherein the analytics packets include enqueue analytics packets and dequeue analytics packets, the enqueue analytics packets including information describing properties associated with a packet being enqueued to the buffer in the network device and the dequeue analytics packets including information describing properties associated with a packet being dequeued from the buffer in the network device.]

[13. The apparatus of claim 9, wherein the information describes buffer occupancy characteristics of the buffer including at least one of: overall buffer occupancy, buffer occupancy based on packet priority, unicast queue length or multicast queue length.]

[14. The apparatus of claim 9, wherein the information describes packet processing properties for packets processed by the network device including at least one of: drop, port mirrored, load balanced, bridged or routed, or packet length.]

[15. The apparatus of claim 9, wherein the information describes packet processing properties for packets corresponding to user defined parameters for one or more of: rate limited, shaped, policed or any programmable bytes of the packet including payload.]

[16. A non-transitory computer readable tangible storage media encoded with instructions that, when executed by a processor of a collector device in communication with a network device operating in the network, cause the processor to:

receive analytics packets containing information describing occupancy of a buffer of the network device caused by packet flow through the buffer in the network device, each analytics packet including a record summarizing characteristics of a packet enqueued in the buffer or of a packet dequeued from the buffer; and replay the information pertaining to the occupancy of the buffer over time based on the analytics packets, by generating data for visually presenting to a user the information pertaining to the occupancy of the buffer over time.]

[17. The non-transitory computer readable tangible storage media of claim 16, further comprising instructions to generate data to replay the information based on one or more filtering criteria.]

[18. The non-transitory computer readable tangible storage media of claim 16, wherein the information describes at least one of: identification of ingress port of arrival of a packet at the network device, Layer 2 source address and destination address, Layer 3 source address and destination address, Layer 4 source address and destination address, class of service, or timestamp of arrival of a packet at the ingress port.]

[19. The non-transitory computer readable tangible storage media of claim 16, wherein the analytics packets include enqueue analytics packets and dequeue analytics packets, the enqueue analytics packets including information describing properties associated with a packet being enqueued to the buffer in the network device and the dequeue analytics packets including information describing properties associated with a packet being dequeued from the buffer in the network device.]

[20. The non-transitory computer readable tangible storage media of claim 16, wherein the information describing buffer occupancy characteristics of the buffer including at least one of: overall buffer occupancy, buffer occupancy based on packet priority, unicast queue length or multicast queue length.]

*21. A method comprising:*

*receiving packets at a network device;*

*capturing information describing an occupancy of a buffer caused by packet flow through the buffer in the network device;*

*selecting one or more packets by applying a filter to the packets in the buffer to provide selected packets;*

*generating an analytics packet including packet characteristics of one or more of the selected packets that flowed through the buffer, wherein the packet characteristics include one or more of: an identification of ingress port of arrival of the packet at the network device, a Layer 2 address, a Layer 3 address, a Layer 4 address, a class of service, or a timestamp corresponding to a packet arrival time at the ingress port;*

*sending the analytics packet to a collector device for analysis of the analytics packet.*

*22. The method of claim 21, further comprising:*

*receiving the analytics packet at the collector device; and*

*performing the analysis of the analytics packet at the collector device.*

*23. The method of claim 22, wherein the receiving and the performing are performed by a CPU and a memory in the network device.*

*24. The method of claim 22, wherein the receiving the analytics packet comprises receiving the analytics packet at the collector device that is connected to the network device via a network.*

*25. The method of claim 21, wherein sending the analytics packet to the collector device includes sending the analytics packet from an egress port on the network device.*

*26. The method of claim 21, wherein the sending the analytics packet comprises sending the analytics packet on a programmable time schedule.*

*27. A method comprising:*

*receiving packets at an ingress port on a network device;*

*placing the packets in a buffer prior to the packets being sent out an egress port of the network device;*

*selecting one or more packets by applying a filter to the packets in the buffer to provide selected packets;*

*generating analytics information describing an occupancy of the buffer, the analytics information including packet characteristics relating to one or more of the selected packets; and*

*sending the analytics information to a collector device for analysis.*

*28. The method of claim 27, wherein the filter relates to the occupancy of the buffer.*

*29. The method of claim 27, wherein the packet characteristics include one or more of: an identification of ingress port of arrival of a packet at the network device, a Layer 2 address, a Layer 3 address, a Layer 4 address, a class of service, or a timestamp corresponding to a packet arrival time at the ingress port.*

*30. The method of claim 27, further comprising:*

*receiving the analytics information at the collector device; and*

*performing the analysis of the analytics information at the collector device.*

*31. The method of claim 30, wherein the receiving and the performing are performed by a CPU and a memory in the network device.*

*32. The method of claim 30, wherein the receiving the analytics information comprises receiving the analytics information at the collector device that is connected to the network device via a network.*

*33. The method of claim 27, wherein sending the analytics information to the collector device includes generating an analytics packet and sending the analytics packet from an egress port on the network device.*

*34. The method of claim 27, wherein the sending includes sending the analytics information on a programmable time schedule.*

*35. The method of claim 27, wherein the analytics information includes queue length information.*

*36. The method of claim 27, wherein the packet characteristics include an indication whether a packet was dropped due to the occupancy of the buffer.*

*37. A network device comprising:*

*a plurality of ingress ports and a plurality of egress ports;*

*a buffer to temporarily store one or more incoming packets received by the network device through one of the ingress ports; and*

*an analytics logic configured to select one or more packets by applying a filter to the packets in the buffer to provide one or more selected packets, generate analytics information describing an occupancy of the buffer, and send the analytics information to a collector device for analysis, wherein the analytics information includes packet characteristics relating to one or more of the selected packets.*

*38. The network device of claim 27, wherein the analytics information includes queue length information.*

*39. The network device of claim 37, wherein the packet characteristics include an indication whether a packet was dropped due to the occupancy of the buffer.*

*40. The network device of claim 37, wherein the packet characteristics include one or more of: an identification of*

*ingress port of arrival of a packet at the network device, a Layer 2 address, a Layer 3 address, a Layer 4 address, a class of service, or a timestamp corresponding to a packet arrival time at the ingress port.*

*41. The network device of claim 37, wherein the collector device comprises a CPU and a memory in the network device.*

*42. The network device of claim 37, wherein the collector device is connected to the network device via a network.*

*43. The network device of claim 37, further comprising an analytics packet assembler configured to generate an analytics packet including the analytics information and send the analytics packet from one of the egress ports.*

* * * * *